US009656161B1

(12) United States Patent
Bowman et al.

(10) Patent No.: US 9,656,161 B1
(45) Date of Patent: May 23, 2017

(54) SYSTEM AND METHOD FOR FACILITATING ASSUMPTION OF PLAYER IDENTITY IN AN ONLINE GAME

(71) Applicant: KABAM, INC., San Francisco, CA (US)

(72) Inventors: Charles Bowman, San Francisco, CA (US); Brian Brause, Cambria, CA (US)

(73) Assignee: Aftershock Services, Inc., San Francisco, CA (US)

( * ) Notice: Subject to any disclaimer, the term of this patent is extended or adjusted under 35 U.S.C. 154(b) by 529 days.

(21) Appl. No.: 14/184,709

(22) Filed: Feb. 20, 2014

(51) Int. Cl.
*A63F 13/00* (2014.01)
*A63F 13/30* (2014.01)

(52) U.S. Cl.
CPC .................................... *A63F 13/12* (2013.01)

(58) Field of Classification Search
CPC ........ A63F 13/71; A63F 13/12; A63F 13/335; G06F 21/33
USPC .......................................... 463/29; 370/395.2
See application file for complete search history.

(56) References Cited

U.S. PATENT DOCUMENTS

| | | | |
|---|---|---|---|
| 7,231,371 B1 * | 6/2007 | Cantini | G06Q 20/367 705/65 |
| 8,010,630 B2 | 8/2011 | Barreto et al. | 709/219 |
| 8,385,916 B2 | 2/2013 | Raleigh | 455/432.1 |
| 8,495,372 B2 | 7/2013 | Bailey et al. | 713/171 |
| 2003/0093668 A1 * | 5/2003 | Multerer | A63F 13/12 713/161 |
| 2008/0318550 A1 | 12/2008 | DeAtley | 455/411 |
| 2009/0052675 A1 * | 2/2009 | Levow | G06F 21/33 380/278 |
| 2009/0112524 A1 * | 4/2009 | Schiefer | G06F 11/2294 702/188 |
| 2011/0047378 A1 * | 2/2011 | Chen | H04L 9/3226 713/168 |
| 2011/0225417 A1 | 9/2011 | Maharajh et al. | 713/150 |
| 2012/0096521 A1 * | 4/2012 | Peddada | G06F 21/629 726/4 |
| 2012/0110330 A1 * | 5/2012 | Dickgiesser | H04L 9/3271 713/168 |
| 2012/0311686 A1 | 12/2012 | Medina et al. | 726/7 |
| 2013/0079153 A1 | 3/2013 | Crowder, Jr. et al. | 463/42 |

* cited by examiner

*Primary Examiner* — Michael Cuff
(74) *Attorney, Agent, or Firm* — Sheppard Mullin Richter & Hampton LLP (57) ABSTRACT

One aspect of the disclosure relates to providing an online game for facilitating assumption of a player identity. The online game comprises a player account associated with the player. By facilitating assumption of a first player identity associated with a first player account, game support personnel and/or an administrator may be substituted for a player in the online game. The assumption of the first player identity may be accomplished through transmission and/or implementation of a private key stored on a client computing platform associated with the first player account, in order to facilitate a different client computing platform (e.g., associated with support personnel) to be authenticated to the first player account. This may allow the support personnel and/or an administrator to directly experience the player problems in the online game.

19 Claims, 7 Drawing Sheets

SYSTEM AND METHOD FOR FACILITATING ASSUMPTION OF PLAYER IDENTITY IN AN ONLINE GAME

FIELD

The disclosure relates to providing an online game for facilitating assumption of a player identity in an online game.

BACKGROUND

Various online games require troubleshooting from the game administrators. A common method of troubleshooting is providing online forums for a player to share and read information about issues common to the on-line game. Another method of troubleshooting allows an administrative panel that runs on the internet to troubleshoot a game through communication with the player. These methods make it difficult understand completely what the player's issues are.

SUMMARY

One aspect of the disclosure relates to providing an online game for facilitating assumption of a player identity. The online game comprises a player account associated with the player. By facilitating assumption of a first player identity associated with a first player account, game support personnel and/or an administrator may be substituted for a player in the online game. The assumption of the first player identity may be accomplished through transmission and/or implementation of a private key stored on a client computing platform associated with the first player account, in order to facilitate a different client computing platform (e.g., associated with support personnel) to be authenticated to the first player account. This may allow the support personnel and/or an administrator to directly experience the player problems in the online game.

A system configured to assume an identity of a player in an online game may include one or more processors configured to execute compute program modules. The program modules may comprise a game module, a user module, an authentication module, a help module, an operator private key encryption module, a database module, and/or any other modules.

The game module may be configured to execute an instance of online game. The game module may implement the instance of the online game to facilitate presentation of the online game on to players on player client computing platforms and/or any other platforms. The instance may be implemented by generating game information that describes a game state of the instance and transmitting the game information to the player client computing platforms and/or any other platforms. The players may include a first player and/or any other players.

The authentication module may be configured to authenticate the player client computing platforms to player accounts associated with the players. Such authentication may involve private keys stored on the player client computing platforms and/or any other platforms. The player client computing platforms may include a first player client computing platform authenticated to a first player account associated with the first player and/or any other player. The first client computing platform may be authenticated to the first player account through implementation of a first private key stored on the first client computing platform and/or any other platform. The player account may be affiliated with a single online game and/or any other games. The player account may be affiliated with multiple online games and/or any other games.

The help module may be configured to receive help requests from the players.

The operator private key encryption module may be configured to provide access to the online game as the players for support personnel on a support client computing platform and/or any other platform. The access may facilitate remediation of the help requests by the support personnel and/or an administrator such that as part of remediating a first help request from the first player, the operator private key encryption module may provide access to the online game as the first player for the support personnel and/or an administrator by effectuating transmission of the first private key to the support client computing platform and/or any other platform. In some implementations, only the support personnel and/or an administrator or the first player may operate the online game. In some implementations, effectuating transmission of the first private key to the support client computing platform may occur on a local area network and/or any other network. In some implementations, the support client computing platform may be authenticated to the first player on a local area network and/or any other network. In some implementations, upon subsequent to transmission of the first private key to the support client computing platform, the support personnel and/or an administrator may replace the first player in the online game to facilitate remediation of the help requests and/or any other requests.

The authentication module may be configured such that subsequent to transmission of the first private key to the support client computing platform, the support client computing platform is authenticated to the first player account enabling the support personnel and/or an administrator to access the online game as the first player and/or any other player. In some implementations, upon the support personnel and/or an administrator restarting the online game, the first player may replace the support personnel and/or an administrator and/or any other personnel.

The database module may be configured to store any subsequent to transmissions of the first private key to the support client computing platform and/or any other platform.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
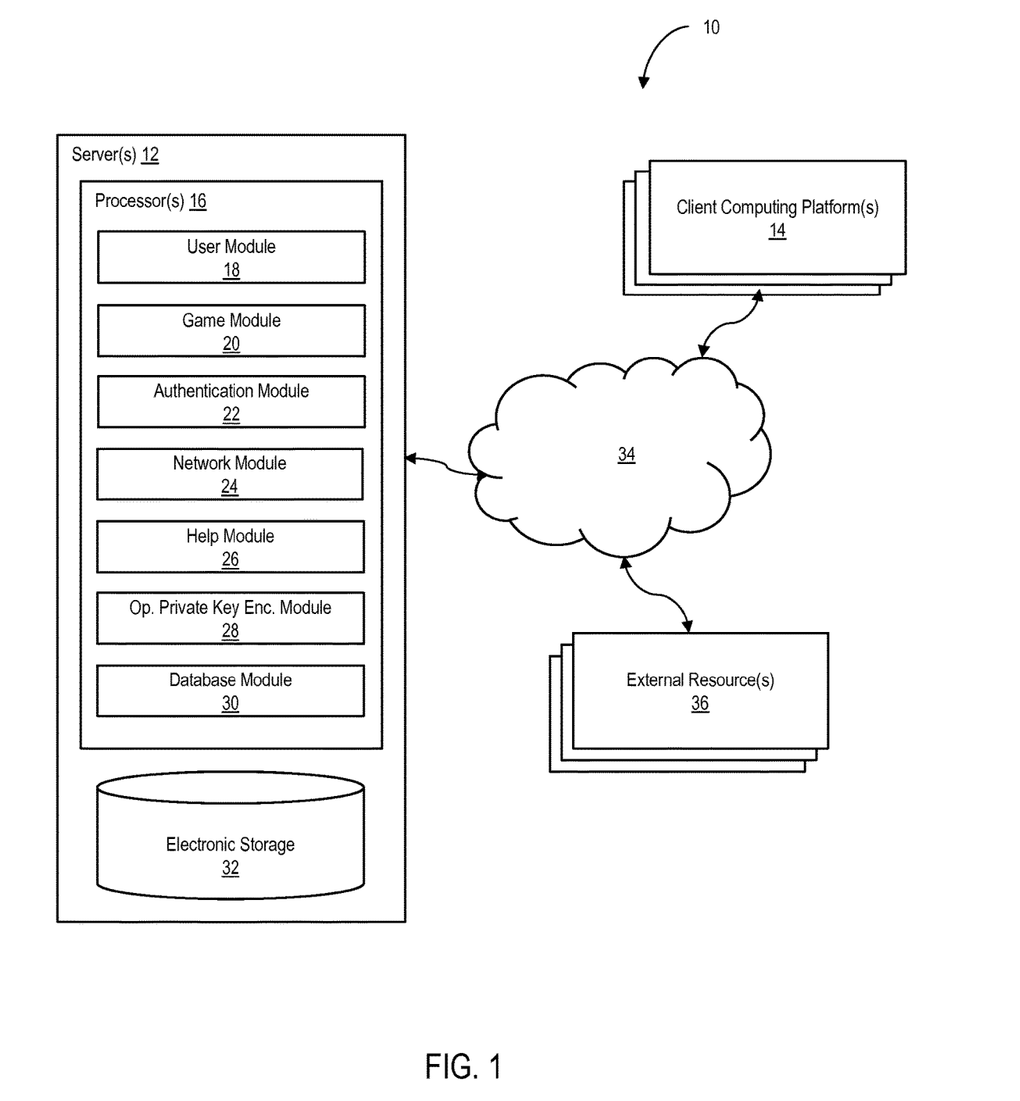
FIG. 1 illustrates an exemplary system configured to providing an online game for facilitating assumption of a player identity, according to an aspect of the invention.

FIG. 1 illustrates a system 10 configured to providing an online game for facilitating assumption of a player identity. In some implementations, system 10 may include a game server(s) 12. The game server(s) 12 may host a game space in which an online game takes place. The game server(s) 12 may be configured to communicate with one or more client computing platform(s) 14 according to a client/server architecture. The players may access system 10 and/or the virtual space via client computing platform(s) 14.

The game server(s) 12 may be configured to execute one or more computer program modules. The computer program modules may include one or more of a user module 18, a game module 20, an authentication module 22, a network module 24, a help module 26, an operator private key encryption module 28, a database module 30, and/or any other modules.

The system may comprise a user module 18 configured to store inventories of virtual items that are available to players in the game space. The inventories may include a first inventory and/or any other inventory of virtual items available to a first player in the game space.

The user module 18 may be configured to access and/or manage one or more player profiles and/or player information associated with players of the system 10. The one or more player profiles and/or player information may include information stored by game server(s) 12, one or more of the client computing platform(s) 14, and/or other storage locations. The player profiles may include, for example, information identifying players (e.g., a player name or handle, a number, an identifier, and/or other identifying information) within the virtual space, security login information (e.g., a login code or password), virtual space account information, subscription information, virtual currency account information (e.g., related to currency held in credit for a player), relationship information (e.g., information related to relationships between players in the virtual space), virtual space usage information, demographic information associated with players, interaction history among players in the virtual space, information stated by players, purchase information of players, browsing history of players, a client computing platform identification associated with a player, a phone number associated with a player, and/or other information related to players.

The user module 18 may be configured to store inventories of virtual items including resources that are available to players in the virtual space. Various matters may be collected in an inventory. These matters may include, but are not limited to, virtual items, virtual resources, character attributes, character skills, and/or virtual currency. A virtual item may be an item that can be used in a virtual world to assist a player's character. Examples of virtual items include, but are not limited to, valuables (e.g., money, valuable metals or gems, etc.), weapons, spell components, defense components, and/or armor. A virtual resource may be a resource that can be used in the virtual world to create game attributes. Examples of virtual resources include wood, stone, herbs, water, ores, animals, monsters, bosses, non-player characters (NPCs), building materials, portions, etc. A character attribute may be any quality, trait, feature and/or characteristic a particular character can have. Character attributes may include, but are not be limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a player character during game play such as, but not limited to: the ability to cast (certain) spells, foretell the future, read minds, use (certain) weapons, cook, hunt, find herbs, assemble herbs into portions, mine, assemble objects into other objects, fly, and/or enchant other player characters.

The player maintains an inventory for the player's character in which virtual awards may be collected. The inventory may be accessed through an interface. As the character or other entity progresses through the game it may receive access to higher-level items. Higher-level items may be more powerful and/or effective within the game. This may include having parameters (e.g., hit points, attack strength, defense points, speed, etc.) that enhance the functionality of the items in the game. The player may be able to review items within the player's inventory and equip the character and/or other entity with an item appropriate to the current game situation. Items may be dragged from the inventory to a preview window. As items are selected, they may appear either on or next to the character or entity. For example, if the character entity is currently not building and/or researching anything, a building may be built and/or research may be started by-accessing the character's inventory and utilizing virtual items. Management of a character's inventory is a common game mechanic, and may lead to many hours of game play. Players may collect, trade, buy, fight over items, and/or perform other actions to add to their inventory. Games in different genres, such as science fiction, may incorporate items specific to that genre. For example, laser guns may be substituted in place of swords as the standard weapon used by characters within a science fiction-type game. The data describing clothing and other equipment or gear may be stored in the character record.

Players within the game may acquire virtual currency, which may be reflected in the player profiles. In such games, the virtual currency might be represented by virtual coins, virtual cash, or by a number or value stored by the server for that player's benefit. Such virtual currency may represent units of value for use as consideration in transactions in the online game system, and/or may be analogous to legal currency. Virtual currency can be purchased for real money consideration. Such purchases may be made for cash or credit denominated in real money, made be made for another virtual currency previously purchased by a player for real money (e.g., Facebook credits, Bitcoins, and/or other virtual currency). A player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

Virtual currency may be used to purchase one or more in-game assets or other benefits. For example, a player may be able to exchange virtual currency for a desired level, access, right, or item in an online game. In some implementations, legal currency can be used to directly purchase an in-game asset or other benefit. The player can select the desired in-game asset or other benefit. Once the necessary selections are made, the player can place the order to purchase the in-game asset or other benefit. This order is received by the game system, which can then process the order. If the order is processed successfully, an appropriate financial account associated with the player can be debited by the amount of virtual currency or legal currency needed to buy the selected in-game asset or other benefit.

Multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. Virtual cash may be awarded for leveling up in the game.

The game module 20 may be configured to execute a game instance of a game space. The game instance may be used to facilitate presentation of views of the game space to players. The game instance may be configured to facilitate interaction of the players with the game space and/or each other by performing operations in the game instance in response to commands and/or any other input received from the players.

The game module 20 may implement the instance of the online game to facilitate presentation of the online game on to players on client computing platforms. The game module may implement the instance of the online game to facilitate presentation of the online game on to players on player client computing platforms and/or any other platforms. The instance may be implemented by generating game information that describes a game state of the instance and transmitting the game information to the player client computing platforms and/or any other platforms. The players may include a first player and/or any other players.

The game module 20 may be configured to implement the instance of the virtual space executed by the computer modules to determine state of the virtual space. The state may then be communicated (e.g., via streaming visual data, via object/position data, and/or other state information) from server(s) 12 to client computing platform(s) 14 for presentation to players. The state determined and transmitted to a given client computing platform(s) 14 may correspond to a view for a player character being controlled by a player via the given client computing platform(s) 14. The state determined and transmitted to a given client computing platform(s) 14 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the player. The instance of the virtual space and/or the game that takes place therein may be persistent. That is, the virtual space and/or the game may continue on whether or not individual players are currently logged in and/or participating in the game. A player that logs out of the virtual space and then logs back in some time later may find the virtual space has been changed through the interactions of other players with the virtual space during the time the player was logged out. These changes may include changes to the simulated physical space, changes in the player's inventory, changes in other players' inventories, changes experienced by non-player characters, and/or other changes.

The instance of the virtual space may comprise a simulated space that is accessible by players via clients (e.g., client computing platform(s) 14) that present the views of the virtual space to a player. The simulated space may have a topography, express ongoing real-time interaction by one or more players, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by game module 20 is not intended to be limiting. The game module 20 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by game module 20, players may control characters, objects, simulated physical phenomena (e.g., wind, rain, earthquakes, and/or other phenomena), and/or other elements within the virtual space to interact with the virtual space and/or each other. The player characters may include avatars. As used herein, the term "player character" may refer to an object (or group of objects) present in the virtual space that represents an individual player. The player character may be controlled by the player with which it is associated. The player controlled element(s) may move through and interact with the virtual space (e.g., non-player characters in the virtual space, other objects in the virtual space). The player controlled elements controlled by and/or associated with a given player may be created and/or customized by the given player. The player may have an "inventory" of virtual goods and/or currency that the player can use (e.g., by manipulation of a player character or other player controlled element, and/or other items) within the virtual space.

The players may participate in the instance of the virtual space by controlling one or more of the available player controlled elements in the virtual space. Control may be exercised through control inputs and/or commands input by the players through client computing platform(s) 14. The players may interact with each other through communications exchanged within the virtual space. Such communications may include one or more of textual chat, instant messages, private messages, voice communications, and/or other communications. Communications may be received and entered by the players via their respective client computing platform(s) 14. Communications may be routed to and from the appropriate players through server(s) 12 (e.g., through game module 20).

The authentication module 22 may be configured to authenticate the player client computing platforms to player accounts associated with the players. Such authentication may involve private keys stored on the player client computing platforms and/or any other platforms, and may involve various cryptographic protocols.

In some implementations, Transport Layer Security (TLS) and Secure Sockets Layer (SSL) are cryptographic protocols that are designed to provide communication security over the Internet. They use cryptography to assure the counterparty whom they are talking with, and to exchange a symmetric and/or private key. This session key is then used to encrypt data flowing between the parties. This may allow for data/message confidentiality, and/or message authentication codes for message integrity and as a by-product message authentication.

In some implementations, the client may send the server the client's SSL version number, cipher settings, session-specific data, and/or any other information that the server needs to communicate with the client using SSL. The server may send the client the server's SSL version number, cipher settings, session-specific data, and/or other information that the client needs to communicate with the server over SSL. The server may send its own certificate, and if the client is requesting a server resource that requires client authentication, the server may request the client's certificate.

In some implementations, the client may use the information sent by the server to authenticate the server. If the server cannot be authenticated, the user may be warned of the problem and may be informed that an encrypted and authenticated connection cannot be established. If the server can be successfully authenticated, the client may proceed to the next step. Using all data generated in the handshake thus far, the client (with the cooperation of the server, depending on the cipher in use) creates the pre-master secret for the session, encrypts it with the server's public key (obtained from the server's certificate, sent in step 2), and then sends the encrypted pre-master secret to the server.

In some implementations, if the server requests client authentication (an optional step in the handshake), the client may also sign another piece of data that is unique to this handshake and known by both the client and server. In this case, the client sends both the signed data and the client's own certificate to the server along with the encrypted pre-master secret. In some implementations, if the server requests client authentication, the server may attempt to authenticate the client. If the client cannot be authenticated, the session may end. If the client can be successfully authenticated, the server may use its private key to decrypt the pre-master secret, and then performs a series of steps (which the client also performs, starting from the same pre-master secret) to generate the master secret.

In some implementations, both the client and the server may use the master secret to generate the session keys, which are symmetric keys used to encrypt and decrypt information exchanged during the SSL session and to verify its integrity (that is, to detect any changes in the data between the time it was sent and the time it is received over the SSL connection). In some implementations, the client may send a message to the server informing it that future messages from the client will be encrypted with the session key. It may then sends a separate (encrypted) message indicating that the client portion of the handshake is finished.

In some implementations, the server may send a message to the client informing it that future messages from the server will be encrypted with the session key. It may then send a separate (encrypted) message indicating that the server portion of the handshake is finished. The SSL handshake may now complete and the session may begin. In some implementations, the client and the server use the session keys to encrypt and decrypt the data they send to each other and to validate its integrity. While this may be the normal operation condition of the secure channel, at any time, due to internal or external stimulus (either automation or user intervention), either side may renegotiate the connection, in which case, the process may repeat itself. This concludes the handshake and begins the secured connection, which is encrypted and decrypted with the key material until the connection closes. In some implementations, if any one of the above steps fails, the TLS handshake fails and the connection is not created.

The player client computing platforms may include a first player client computing platform authenticated to a first player account associated with the first player and/or any other player. The first client computing platform may be authenticated to the first player account through implementation of a first private key stored on the first client computing platform and/or any other platform. In some implementations, the system may use only private keys. This may require the private key to be installed on specific computers that will be used for exchanging messages and/or assuming identities between certain players and/or operators.

The player account may be affiliated with a single online game and/or any other games. The player account may be affiliated with multiple online games and/or any other games. In some implementations, the player account may be an account on the central server and/or within a peer-to-peer network that contains a player profile including personal, billing, and character account information. In some implementations, player attributes may be applied to a player account. Player attributes may include, but not be limited to: real currency; discount of monthly fees for playing game; monthly fee for playing a game; interest rates for use of or borrowing real or virtual cash amounts; global character attribute settings for all characters created by player across multiple games; rewards for encouraging another player to sign up to play.

The network module 24 of the game server(s) 12 may be configured to maintain a connection to the one or more client computing platform(s) 14. For example, the network module 24 may maintain one or more communication lines or ports to enable connection and/or exchange of information with a network 34 and/or other computing platform(s) 14. Information such as state information, game state and game logic may be communicated via network module. The network module 24 may be configured to receive information from the client computing platform(s) 14 as well.

The help module 26 may be configured to receive help requests from the players. In some implementations, after a help request has been received, a support personnel and/or an administrator may find the player/user of the application from within their game's administration panel. The support personnel and/or administrator may then, press the "Assume User" button on the panel. After pressing the "Assume User" button, the support personnel and/or administration tool may push all necessary data required to become the user to the administrator's mobile device over a socket connection.

The operator private key encryption module 28 may be configured to provide access to the online game as the players for support personnel and/or an administrator on a support client computing platform and/or any other platform. The access may facilitate remediation of the help requests by the support personnel and/or an administrator such that as part of remediating a first help request from the first player, the operator private key encryption module may provide access to the online game as the first player for the support personnel and/or an administrator by effectuating transmission of the first private key to the support client computing platform and/or any other platform.

In some implementations, the data required to become a user is the private key of the user and the application programming interface (API) uniform resource locators (URLs) of the user. In some implementations, the device may use these new user credentials to switch the administrators account credentials to the new user's credentials. This may log the administrator in as the player.

In some implementations, only the support personnel and/or an administrator or the first player may operate the online game. In some implementations, effectuating transmission of the first private key to the support client computing platform may occur on a local network and/or any other network. In some implementations, the support client computing platform may be authenticated to the first player on a local area network (LAN) and/or any other network. In some implementations, a LAN may supply networking capability to a group of computers in close proximity to each other such as in an office building, a school, or a home.

In some implementations, upon subsequent to transmission of the first private key to the support client computing platform, the support personnel and/or an administrator may replace the first player in the online game to facilitate remediation of the help requests and/or any other requests. In some implementations, after the administrator accesses the player's game, the player may no longer have any control capabilities in the game.

The authentication module 22 may be configured such that subsequent to transmission of the first private key to the support client computing platform, the support client computing platform is authenticated to the first player account enabling the support personnel and/or administrator to access the online game as the first player and/or any other player. In some implementations, the administrator may acquire all the controls the player has, and may be able to affect the game.

The database module may be configured to store any subsequent to transmissions of the first private key to the support client computing platform and/or any other platform. In some implementations, upon the support personnel and/or an administrator restarting the online game, the first player may replace the support personnel and/or administrator and/or any other personnel. In some implementations, when the administrator is finished using the application the player, he may restart the application. In some implementations, on application start the application deletes the player credentials and logs the player in as the administrator. A record of the player morphing may then be stored in the database for record keeping.

The game server(s) 12, client computing platform(s) 14, and/or external resource(s) 36 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which game server(s) 12, client computing platform(s) 14, and/or external resource(s) 36 may be operatively linked via some other communication media.

Game server(s) 12 may include electronic storage 32, one or more processors 16, and/or other components. Game server(s) 12 may include communication lines, or ports to enable the exchange of information with a network 34 and/or other computing platform(s) 14. Network 34 may be a private network and/or a local area network. Illustration of game server(s) 12 in FIG. 1 is not intended to be limiting. Game server(s) 12 may include a plurality of hardware, software, and/or firmware components operating together to provide the functionality attributed herein to game server(s) 12. For example, game server(s) 12 may be implemented by a cloud of computing platforms operating together as game server(s) 12.

Electronic storage 32 may comprise non-transitory storage media that electronically stores information. The electronic storage media of electronic storage 32 may include one or both of system storage that is provided integrally (i.e., substantially non-removable) with game server(s) 12 and/or removable storage that is removably connectable to game server(s) 12 via, for example, a port (e.g., a USB port, a firewire port, etc.) or a drive (e.g., a disk drive, etc.). Electronic storage 32 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 32 may include one or more virtual storage resources (e.g., cloud storage, a virtual private network, and/or other virtual storage resources). Electronic storage 32 may store software algorithms, information determined by processor(s) 16, information received from game server(s) 12, information received from client computing platform(s) 14, and/or other information that enables game server(s) 12 to function as described herein.

Processor(s) 16 is configured to provide information processing capabilities in game server(s) 12. As such, processor(s) 16 may include one or more of a digital processor, an analog processor, a digital circuit designed to process information, an analog circuit designed to process information, a state machine, and/or other mechanisms for electronically processing information. Although processor(s) 16 is shown in FIG. 1 as a single entity, this is for illustrative purposes only. In some implementations, processor(s) 16 may include a plurality of processing units. These processing units may be physically located within the same device, or processor(s) 16 may represent processing functionality of a plurality of devices operating in coordination. The processor(s) 16 may be configured to execute modules 18, 20, 22, 24, 26, 28 and/or 30. Processor(s) 16 may be configured to execute modules 18, 20, 22, 24, 26, 28 and/or 30 by software; hardware; firmware; some combination of software, hardware, and/or firmware; and/or other mechanisms for configuring processing capabilities on processor(s) 16. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 18, 20, 22, 24, 26, 28 and/or 30 are illustrated in FIG. 1 as being implemented within a single processing unit, in implementations in which processor includes multiple processing units, one or more of modules 18, 20, 22, 24, 26, 28 and/or 30 may be implemented remotely from the other modules. The description of the functionality provided by the different modules 18, 20, 22, 24, 26, 28 and/or 30 described below is for illustrative purposes, and is not intended to be limiting, as any of modules 18, 20, 22, 24, 26, 28 and/or 30 may provide more or less functionality than is described. For example, one or more of modules 18, 20, 22, 24, 26, 28 and/or 30 may be eliminated, and some or all of its functionality may be provided by other ones of modules 18, 20, 22, 24, 26, 28 and/or 30. As another example, processor(s) 16 may be configured to execute one or more additional modules that may perform some or all of the functionality attributed below to one of modules 18, 20, 22, 24, 26, 28 and/or 30.

A given client computing platform(s) 14 may include one or more processors configured to execute computer program modules. The computer program modules may be configured to enable an expert or player associated with the given client computing platform(s) 14 to interface with system 10, game server(s) 12, and/or external resource(s) 36, and/or provide other functionality attributed herein to client computing platform(s) 14. By way of non-limiting example, the given client computing platform(s) 14 may include one or more of a desktop computer, a laptop computer, a handheld computer, a tablet computing platform, a NetBook, a Smartphone, a gaming console, and/or other computing platforms.

External resource(s) 36 may include sources of information, hosts and/or providers of virtual spaces outside of system 10, external entities participating with system 10, and/or other resources. In some implementations, some or all of the functionality attributed herein to external resource(s) 36 may be provided by resources included in system 10.

Figure 2:
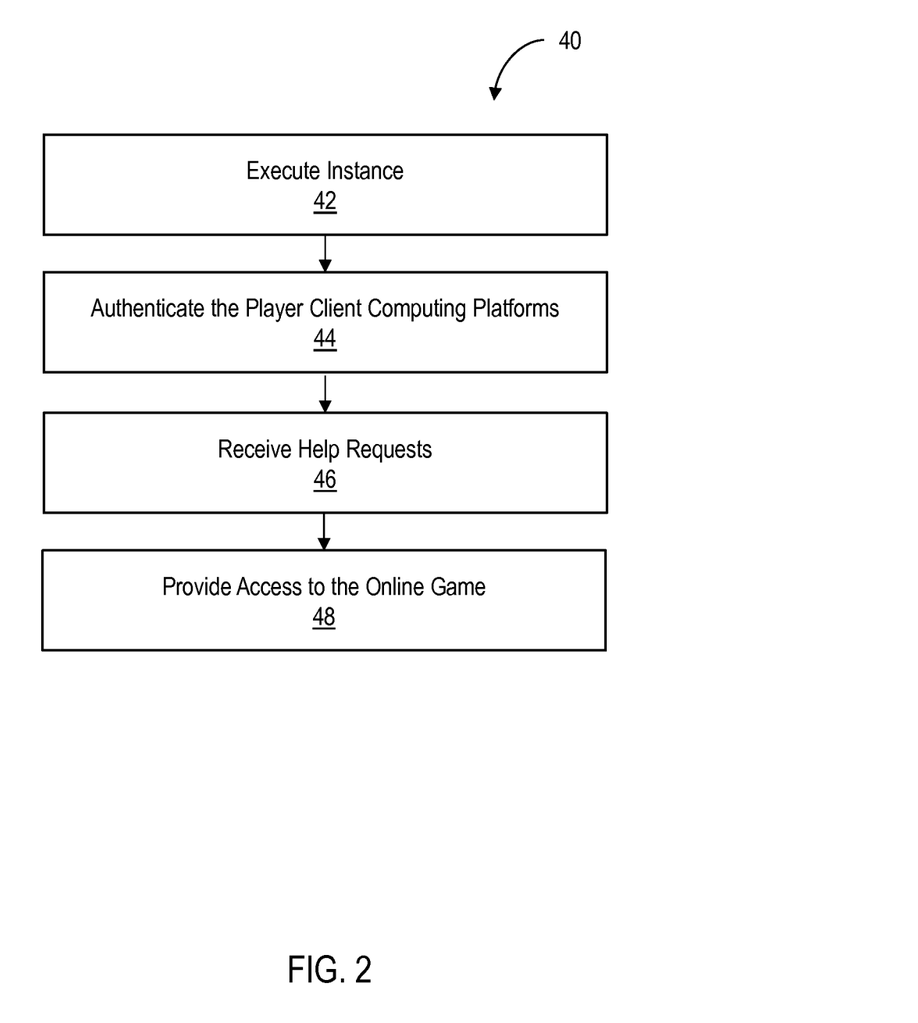
FIG. 2 illustrates an exemplary method of providing an online game for facilitating assumption of a player identity, according to an aspect of the invention.

FIG. 2 illustrates an exemplary method of providing an online game for facilitating assumption of a player identity. The operations of method 40 presented below are intended to be illustrative. In some embodiments, method 40 may be accomplished with one or more additional operations not described, and/or without one or more of the operations discussed. The order in which the operations of method 40 are illustrated in FIG. 2 and described below is not intended to be limiting.

In some embodiments, method 40 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 40 in response to instructions stored electronically on an electronic storage medium. The one or more processing devices may include one or more devices configured through hardware, firmware, and/or software to be specifically designed for execution of one or more of the operations of method 40.

At an operation 42, an instance of a virtual space may be executed. In some implementations, operation 42 may be performed by a game module the same as or similar to game module 20 (shown in FIG. 1 and described above).

At an operation 44, the executed instance of the virtual space may authenticate the player client computing platforms. In some implementations, operation 44 may be performed by an authentication module the same as or similar to authentication module 22 (shown in FIG. 1 and described above).

At an operation 46, the executed instance of the virtual space may receive help requests. In some implementations, operation 46 may be performed by a help module the same as or similar to help module 26 (shown in FIG. 1 and described above).

At an operation 48, the executed instance of the virtual space may authenticate the player client computing platforms. In some implementations, operation 48 may be performed by an operator private key encryption module the same as or similar to operator private key encryption module 28 (shown in FIG. 1 and described above).

Figure 3:
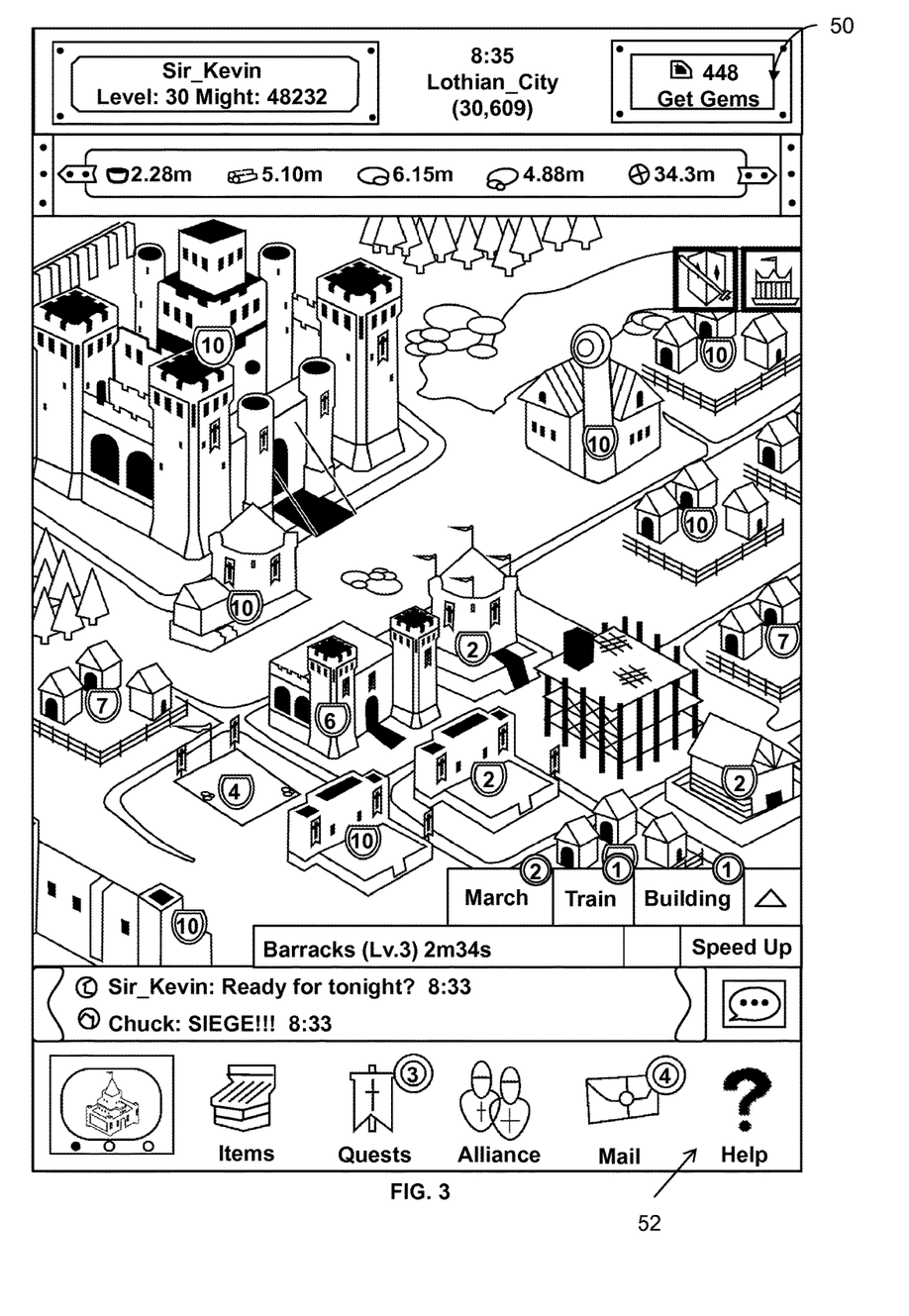
FIG. 3 illustrates an exemplary diagram of a user interface which provides an online game for facilitating assumption of a player identity, according to an aspect of the invention.

FIG. 3 illustrates an exemplary diagram of a user interface 50 which provides an online game for facilitating assumption of a player identity, according to an aspect of the invention. As shown, user interface 50 enables a player to request for help by selecting the help icon 52.

Figure 4:
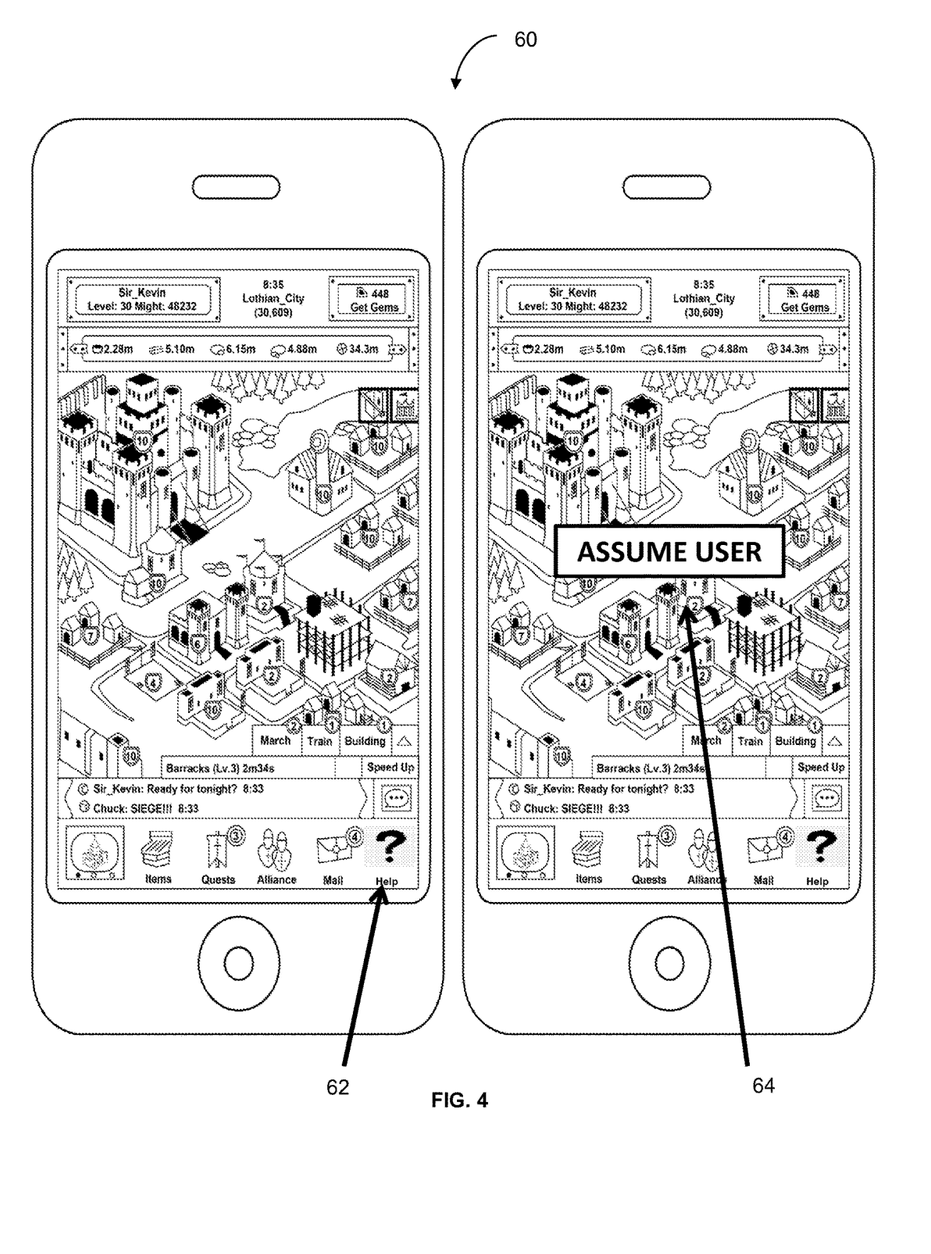
FIG. 4 illustrates an exemplary diagram of a user interface which provides an online game for facilitating assumption of a player identity, according to an aspect of the invention.

FIG. 4 illustrates an exemplary diagram of a user interface 60 which provides an online game for facilitating assumption of a player identity, according to an aspect of the invention. In some implementations, after a help request has been received 62, a support personnel and/or an administrator may find the player/user of the application from within their game's administration panel. The support personnel and/or administrator may then, press the "Assume User" button 64 on the panel. After pressing the "Assume User" button 64, the support personnel and/or administration tool may push all necessary data required to become the user to the administrator's mobile device over a socket connection.

Figure 5:
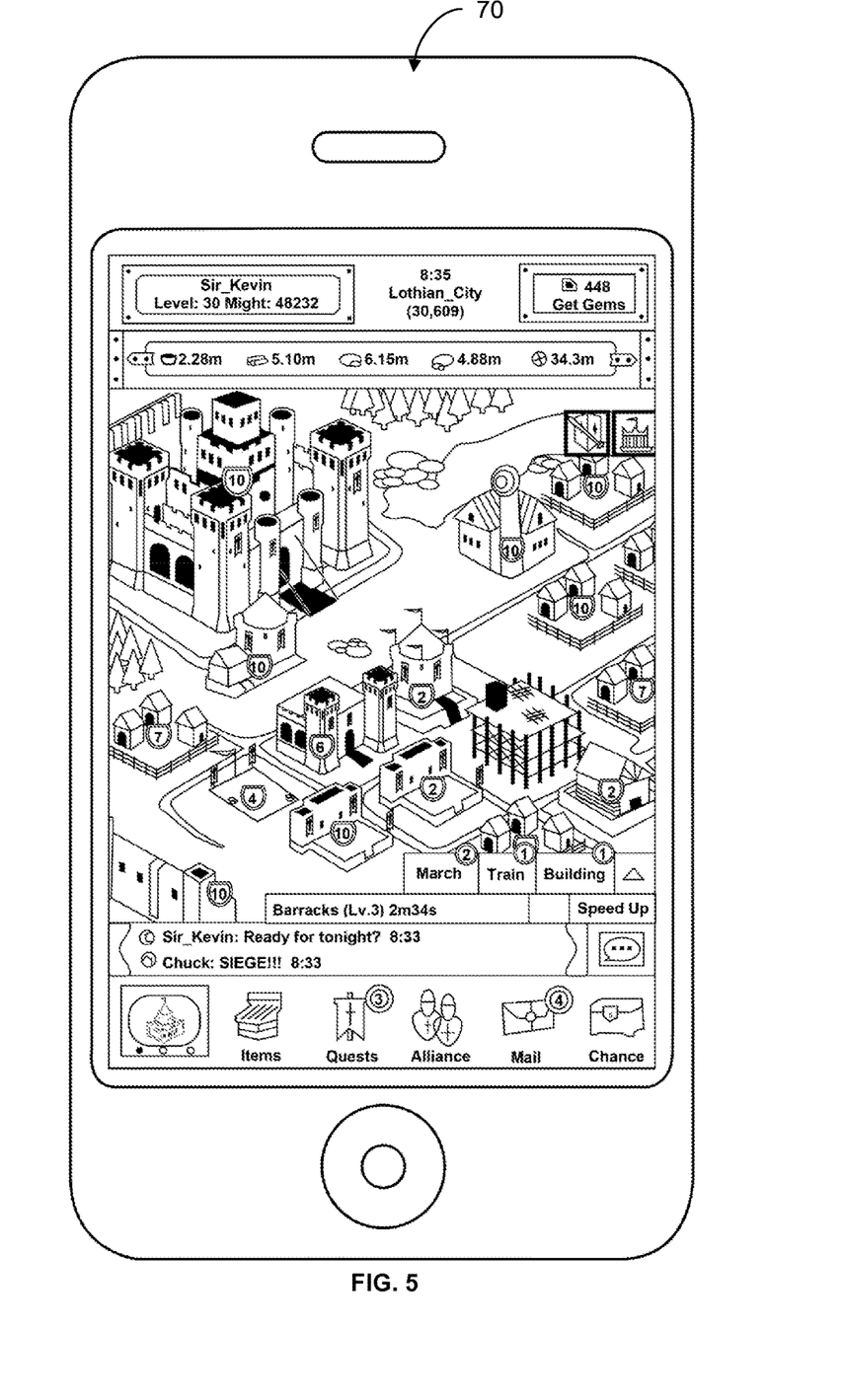
FIG. 5 illustrates an exemplary diagram of a user interface which provides an online game for facilitating assumption of a player identity, according to an aspect of the invention.

FIG. 5 illustrates an exemplary diagram of a user interface 70 which provides an online game for facilitating assumption of a player identity, according to an aspect of the invention. There may be several platforms in which the game may be implemented. Some platforms may include hardware platforms, operating system platforms and/or software platforms. In some implementations, hardware platform may include different types of systems in general (e.g., mainframe, workstation, desktop, handheld and/or embedded) and/or the specific type of processor (e.g., x86, SPARC, PowerPC and/or Alpha).

Figure 6:
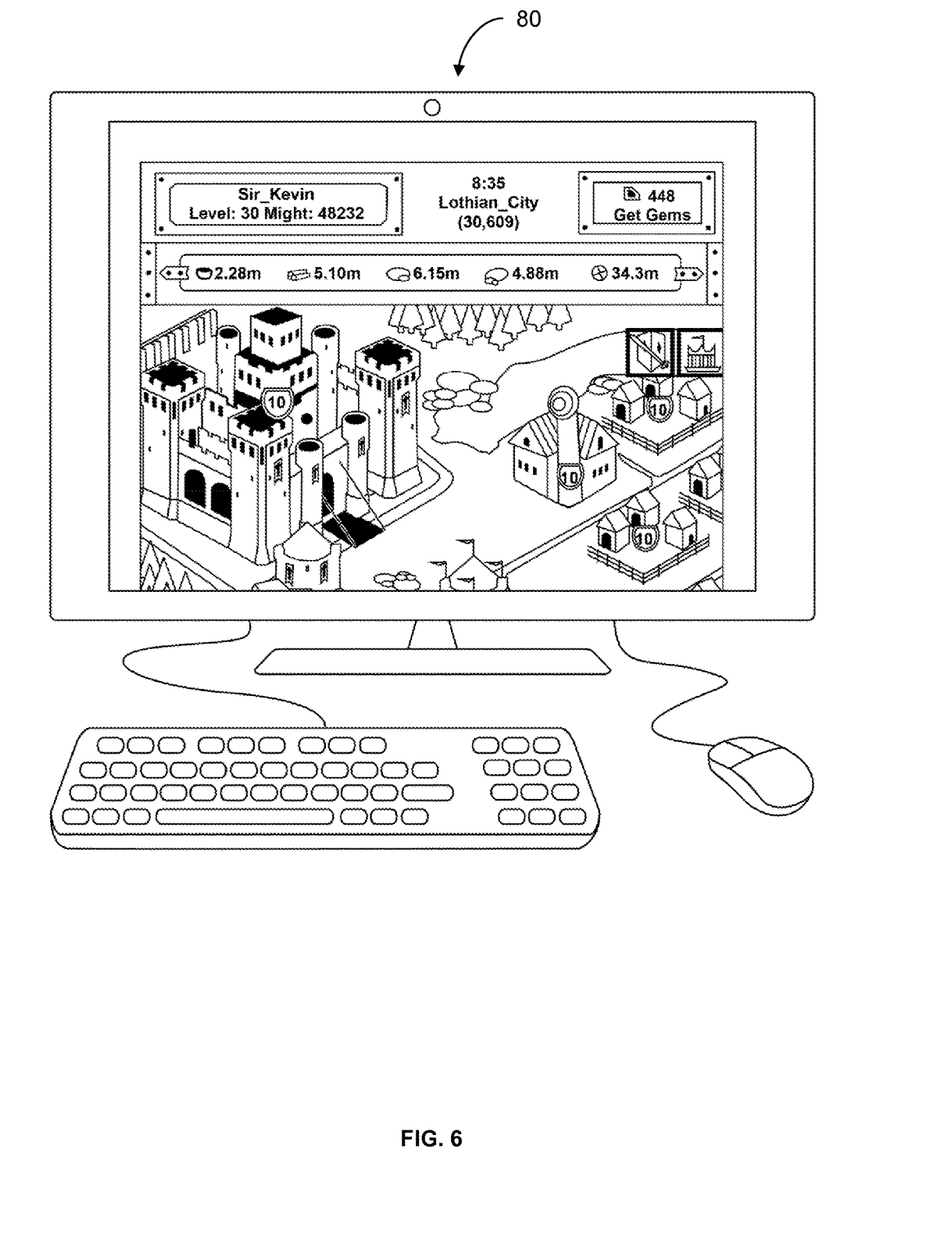
FIG. 6 illustrates an exemplary diagram of a user interface which provides an online game for facilitating assumption of a player identity, according to an aspect of the invention.

FIG. 6 illustrates an exemplary diagram of a user interface 80 which provides an online game for facilitating assumption of a player identity, according to an aspect of the invention.

Figure 7:
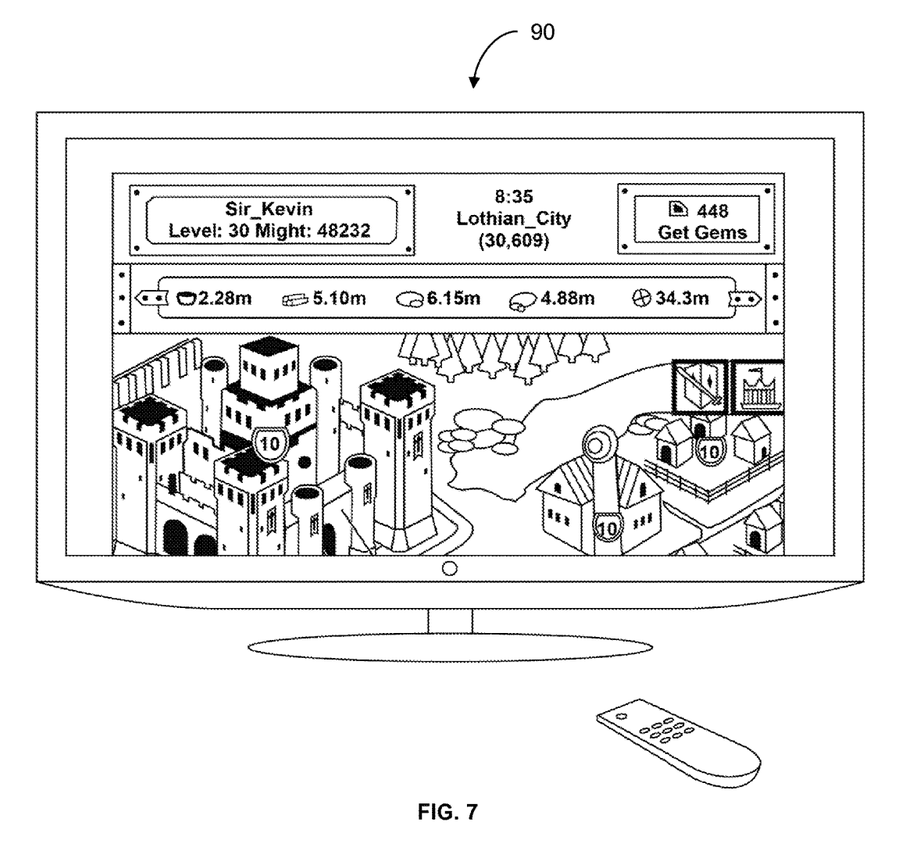
FIG. 7 illustrates an exemplary diagram of a user interface which provides an online game for facilitating assumption of a player identity, according to an aspect of the invention.

FIG. 7 illustrates an exemplary diagram of a user interface 90 which provides an online game for facilitating assumption of a player identity, according to an aspect of the invention.

It would be understood by one of ordinary skill in the art that the player interfaces may not be limited to the embodiment illustrated in FIGS. 3-7. The player interfaces may be associated with any objective, activity, action, or a combination thereof.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate assumption of an identity of a player in an online game, the system comprising:
    one or more processors configured by machine-readable instructions to:
        execute an instance of online game, and to implement the instance of the online game to facilitate presentation of the online game to players on player client computing platforms by generating game information that describes a game state of the instance and transmitting the game information to the player client computing platforms, the players including a first player;
        authenticate the player client computing platforms to player accounts associated with the players, such authentication involving private keys stored on the player client computing platforms, the player client computing platforms including a first player client computing platform authenticated to a first player account associated with the first player, the first client computing platform being authenticated to the first player account through implementation of a first private key stored on the first client computing platform;
    receive help requests from the players; and
    provide access to the online game as the players for support personnel on a support client computing platform, separate and distinct from the client computing platforms, to facilitate remediation of the help requests by the support personnel such that as part of remediating a first help request from the first player, access to the online game as the first player is provided for the support personnel by effectuating transmission of the first private key to the support client computing platform, wherein providing access to the online game as the players includes enabling the support personnel to interact with the instance of the online game as the first player by performing game functions within the online game as the first player, and
    wherein subsequent to transmission of the first private key to the support client computing platform, the support client computing platform is authenticated to the first player account enabling the support personnel to access the online game as the first player, such that the support personnel does not have access to the first player's security login information and is still able to access the online game as the first player.

2. The system of claim 1, wherein the player account is affiliated with a single online game.

3. The system of claim 1, wherein the player account is affiliated with multiple online games.

4. The system of claim 1, wherein only the support personnel or the first player may operate the online game.

5. The system of claim 1, wherein the effectuating transmission of the first private key to the support client computing platform occurs on a local area network.

6. The system of claim 1, wherein the support client computing platform is authenticated to the first player on a local area network.

7. The system of claim 1, wherein upon subsequent to transmission of the first private key to the support client computing platform, the support personnel replaces the first player in the online game to facilitate remediation of the help requests.

8. The system of claim 7, wherein upon the support personnel restarting the online game, the first player replaces the support personnel.

9. The system of claim 1, wherein the one or more processors are
    configured by machine-readable instructions to store any subsequent to transmissions of the first private key to the support client computing platform.

10. A computer implemented method configured to facilitate assumption of an identity of a player in an online game, the method being implemented in a computer system that includes one or more physical processors, the method comprising:
    executing an instance of online game, and implementing the instance of the online game to facilitate presentation of the online game to players on player client computing platforms by generating game information that describes a game state of the instance and transmitting the game information to the player client computing platforms, the players including a first player;
    authenticating the player client computing platforms to player accounts associated with the players, such authentication involving private keys stored on the player client computing platforms, the player client computing platforms including a first player client computing platform authenticated to a first player account associated with the first player, the first client computing platform being authenticated to the first player account through implementation of a first private key stored on the first client computing platform;
    receiving help requests from the players; and
    providing access to the online game as the players for support personnel on a support client computing platform, separate and distinct from the client computing platforms, to facilitate remediation of the help requests by the support personnel such that as part of remediating a first help request from the first player, providing access to the online game as the first player for the support personnel by effectuating transmission of the first private key to the support client computing platform, wherein providing access to the online game as the players includes enabling the support personnel to interact with the instance of the online game as the first player by performing game functions within the online game as the first player, and
    wherein subsequent to transmission of the first private key to the support client computing platform, the support client computing platform is authenticated to the first player account enabling the support personnel to access the online game as the first player, such that the support personnel does not have access to the first player's security login information and is still able to access the online game as the first player.

11. The method of claim 10, wherein the player account is affiliated with a single online game.

12. The method of claim 10, wherein the player account is affiliated with multiple online games.

13. The method of claim 10, wherein only the support personnel or the first player may operate the online game.

14. The method of claim 10, wherein the effectuating transmission of the first private key to the support client computing platform occurs on a local area network.

15. The method of claim 10, wherein the support client computing platform is authenticated to the first player on a local area network.

16. The method of claim 10, wherein upon subsequent to transmission of the first private key to the support client computing platform, the support personnel replaces the first player in the online game to facilitate remediation of the help requests.

17. The method of claim 10, wherein upon the support personnel restarting the online game, the first player replaces the support personnel.

18. The method of claim 10, the method further comprising:
storing any subsequent to transmissions of the first private key to the support client computing platform.

19. A system configured to facilitate assumption of an identity of a player in an online game, the system comprising:
one or more processors configured by machine-readable instructions to:
execute an instance of online game, and to implement the instance of the online game to facilitate presentation of the online game to players on player client computing platforms by generating game information that describes a game state of the instance and transmitting the game information to the player client computing platforms, the players including a first player;
authenticate the player client computing platforms to player accounts associated with the players, such authentication involving private keys stored on the player client computing platforms, the player client computing platforms including a first player client computing platform authenticated to a first player account associated with the first player, the first client computing platform being authenticated to the first player account through implementation of a first private key stored on the first client computing platform;
receive help requests from the players; and
provide access to the online game as the players for support personnel on a support client computing platform to facilitate remediation of the help requests by the support personnel such that as part of remediating a first help request from the first player, access to the online game as the first player is provided for the support personnel by effectuating transmission of the first private key to the support client computing platform, wherein providing access to the online game as the players includes enabling the support personnel to interact with the instance of the online game as the first player by performing game functions within the online game as the first player, and
wherein subsequent to transmission of the first private key to the support client computing platform, the support client computing platform is authenticated to the first player account enabling the support personnel to access the online game as the first player, such that the support personnel does not have access to the first player's security login information and is still able to access the online game as the first player, and
one or more support processors associated with the support client computing platform, wherein the one or more support client processors are separate and distinct from the one or more processors, and wherein the one or more support client processors are configured by machine-readable instructions to receive the first private key that authenticates the support client computing platform enabling the support personnel to access the online game as the first player via the support client computing platform.

* * * * *